(12) United States Patent
Circello et al.

(10) Patent No.: US 9,418,246 B2
(45) Date of Patent: Aug. 16, 2016

(54) DECRYPTION SYSTEMS AND RELATED METHODS FOR ON-THE-FLY DECRYPTION WITHIN INTEGRATED CIRCUITS

(71) Applicants: Joseph C. Circello, Phoenix, AZ (US);
David J. Schimke, Phoenix, AZ (US);
Mohit Arora, Austin, TX (US);
Lawrence L. Case, Austin, TX (US);
Rodney D. Ziolkowski, Del Mar, CA (US)

(72) Inventors: Joseph C. Circello, Phoenix, AZ (US);
David J. Schimke, Phoenix, AZ (US);
Mohit Arora, Austin, TX (US);
Lawrence L. Case, Austin, TX (US);
Rodney D. Ziolkowski, Del Mar, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/570,706

(22) Filed: Dec. 15, 2014

(65) Prior Publication Data

US 2016/0171249 A1     Jun. 16, 2016

(51) Int. Cl.
*G06F 21/00* (2013.01)
*G06F 21/72* (2013.01)
*H04L 9/06* (2006.01)
*H04L 9/14* (2006.01)

(52) U.S. Cl.
CPC .............. *G06F 21/72* (2013.01); *H04L 9/0631* (2013.01); *H04L 9/14* (2013.01)

(58) Field of Classification Search
CPC ....................................................... G06F 21/10
See application file for complete search history.

(56) References Cited

U.S. PATENT DOCUMENTS

| | | | |
|---|---|---|---|
| 5,381,480 A | 1/1995 | Butter et al. | |
| 7,505,598 B2 | 3/2009 | Baer et al. | |
| 7,702,100 B2 | 4/2010 | Han et al. | |
| 8,051,300 B2 * | 11/2011 | Cherian | G06F 3/0605 380/277 |
| 8,175,276 B2 | 5/2012 | Tkacik et al. | |
| 2001/0018736 A1 * | 8/2001 | Hashimoto | G06F 21/10 713/1 |
| 2004/0015707 A1 * | 1/2004 | Lee | G06F 21/85 713/189 |

(Continued)

FOREIGN PATENT DOCUMENTS

| | | |
|---|---|---|
| EP | 1679632 A2 | 7/2006 |
| WO | WO2009/029842 A1 | 3/2009 |

OTHER PUBLICATIONS

Schaad et al., "Advanced Encryption Standard (AES) Key Wrap Algorithm", Sep. 2002, 39 pgs.

(Continued)

*Primary Examiner* — Morshed Mehedi

(57) ABSTRACT

Methods and systems are disclosed for on-the-fly decryption within an integrated circuit that adds zero additional cycles of latency within the overall decryption system performance. A decryption system within a processing system integrated circuit generates an encrypted counter value using an address while encrypted code associated with an encrypted software image is being obtained from an external memory using the address. The decryption system then uses the encrypted counter value to decrypt the encrypted code and to output decrypted code that can be further processed. A secret key and an encryption engine can be used to generate the encrypted counter value, and an exclusive-OR logic block can process the encrypted counter value and the encrypted code to generate the decrypted code. By pre-generating the encrypted counter value, additional cycle latency is avoided. Other similar data independent encryption/decryption techniques can also be used such as output feedback encryption/decryption modes.

20 Claims, 7 Drawing Sheets

(56) References Cited

U.S. PATENT DOCUMENTS

| | | | |
|---|---|---|---|
| 2005/0190919 A1* | 9/2005 | Baer | H04L 63/0457 380/270 |
| 2006/0026417 A1* | 2/2006 | Furusawa | G06F 21/5755 713/2 |
| 2009/0060197 A1 | 3/2009 | Taylor et al. | |
| 2009/0150631 A1* | 6/2009 | Wilsey | G06F 12/1408 711/163 |
| 2009/0259855 A1* | 10/2009 | de Cesare | G06F 21/51 713/189 |
| 2011/0158403 A1 | 6/2011 | Mathew et al. | |
| 2013/0129086 A1* | 5/2013 | Tang | G06F 21/10 380/44 |

OTHER PUBLICATIONS

Premier Ministre, "Protection Profile-On-The-Fly Mass Storage Encryption Application", Aug. 2008, 43 pgs.
Wikipedia, "Multidimensional Parity-Check Code", Dec. 2012, 2 pgs.
Federal Information, Processing Standards Publication 197, Advanced Encryption Standard (AES), Nov. 26, 2001, 47 pgs.
Dworkin, "Recommendation for Block Cipher Modes of Operation", NIST Special Publication 800-38A, 2001, 59 pgs.
Cicello et al., "Key Management for On-The-Fly Hardware Decryption Within Integrated Circuits", U.S. Appl. No. 14/570,611, filed Dec. 15, 2014, FRSC:042, 23 pgs.

* cited by examiner

DECRYPTION SYSTEMS AND RELATED METHODS FOR ON-THE-FLY DECRYPTION WITHIN INTEGRATED CIRCUITS

RELATED APPLICATIONS

This application is related in subject matter to the following concurrently filed application: U.S. patent application Ser. No. 14/570,611, entitled "KEY MANAGEMENT FOR ON-THE-FLY HARDWARE DECRYPTION WITHIN INTEGRATED CIRCUITS," which is each hereby incorporated by reference in its entirety.

TECHNICAL FIELD

This technical field relates to decryption of encrypted software images and, more particularly, to low latency decryption within an integrated circuit.

BACKGROUND

It is often desirable to protect application software code that is loaded from external memory and executed by processors embedded within integrated circuits. As such, certain embedded processor systems use a decryption engine and a secret key to decrypt software images that are encrypted and stored in external memory systems. For these security applications, a cryptographic algorithm according to the Advanced Encryption Standard (AES) is often used to encrypt the software image, and an AES decryption engine is then often used within the integrated circuit to decrypt the encrypted software image. AES encryption/decryption is well known and is commonly applied to provide secured protection of code and data in various environments. AES algorithms operate on 128-bit (16 byte) data blocks with either 128-bit, 192-bit, or 256-bit secret keys. Further, AES algorithms also use variable numbers of cryptographic calculation rounds depending upon the size of the secret key being used. For example, where a 128-bit secret key is used for AES encryption, data is typically processed through a series of calculations requiring ten (10) rounds to complete. Each round can perform different data transformations including: (1) byte substitution using a substitution table, (2) shifting rows of a state array by different offsets, (3) mixing data within columns of a state array, and/or (4) adding a round key to the state. The AES decryption function uses the same 128-bit secret key to reverse the encryption provided by the AES encryption function.

For secure applications with certain external memories, such as Quad-SPI (quad-serial-peripheral-interface) flash (non-volatile) memories, execute-in-place operational modes can cause difficulties with existing integrated circuit processing systems. For example, a decryption engine for such an execute-in-place operational mode may require that encrypted code be decrypted in real-time thereby allowing direct execution of code being accessed from the external memory system. However, a significant challenge for such real-time execution is the speed at which decryption is performed within the integrated circuit. An internal cryptographic system that increases latency to perform decryption will adversely affect system performance. As such, the decryption processing selected for such a decryption system can have a negative impact on overall latency for the system and thereby degrade system performance.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Methods and systems are disclosed for decryption within an integrated circuit to provide an on-the-fly decryption system that adds zero additional cycles of latency within the overall system performance. For the disclosed embodiments, a decryption system within a processing system integrated circuit generates an encrypted counter value using an address while encrypted code associated with an encrypted software image is being obtained from an external memory using the address. The decryption system then uses the encrypted counter value to decrypt the encrypted code and to output decrypted code that can be further processed within the processing system integrated circuit. A secret key and an encryption engine can be used to generate the encrypted counter value, and an exclusive-OR logic block can process the encrypted counter value and the encrypted code to generate the decrypted code. By pre-generating the encrypted counter value while the encrypted code is being obtained from the external memory, the decryption system adds zero additional cycles of latency to the overall system performance. Other data independent encryption/decryption techniques can also be used such as output feedback encryption/decryption modes. Different features and variations can be implemented, as desired, and related or modified systems and methods can be utilized, as well.

The disclosed embodiments allow direct execute-in-place (XIP) processing of encrypted code images stored in external memories with zero additional cycles of latency, thereby enhancing security and offering strong code protection without degrading system level performance. Rather than simply applying an exclusive-OR (XOR) logic function within the encryption/decryption systems along with a secret key, the disclosed counter-mode decryption embodiments also apply unique counters associated with system addresses for the encrypted code being accessed from external memory. As such, when encrypted data blocks are received from the external memory by the processing system integrated circuit, the decryption system within the integrated circuit uses the secret key and the unique counter along with an XOR logic block to decrypt the encrypted data blocks. These counter-mode decryption techniques applied by the embodiments described herein improve code and read-only data security while allowing for pre-generation of encrypted counter values within the processing system integrated circuit. As such, zero additional cycles of latency is experienced by the overall system, and degradation of system performance is avoided while still providing significant protection for the encrypted software image being accessed by the integrated circuit from external memory. Other variations can also be implemented as desired.

Figure 1:
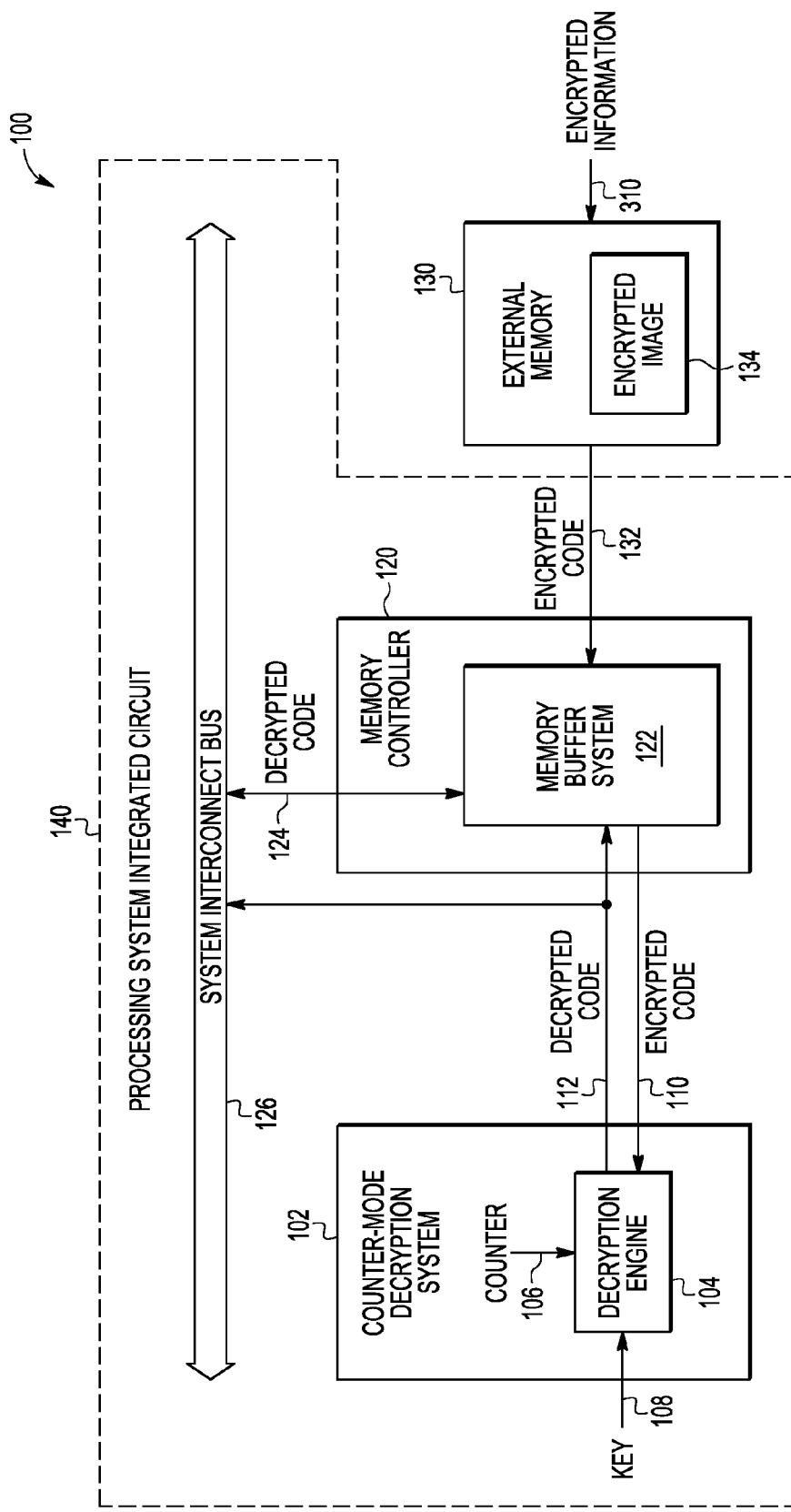
FIG. 1 is a block diagram of an example embodiment for a processing system integrated circuit that decrypts encrypted code for an encrypted software image stored within an external memory using a counter-mode decryption system while avoiding additional system latency.

FIG. 1 is a block diagram of an example embodiment 100 including an external memory 130 connected to a processing system integrated circuit 140 that includes a counter-mode decryption system 102. The external memory 130 stores an encrypted software image 134, and blocks of encrypted code 132 from the encrypted software image 134 are communicated to and executed by the processing system integrated circuit 140. The memory controller 120 communicates with the external memory 130, for example using one or more addresses as described further below, and receives encrypted code 132 from the external memory 130. The encrypted code 132 is stored within a memory buffer system 122, which can include one or more input and/or output data storage buffers. The decryption system 102 receives and decrypts encrypted code 110 from the memory buffer system 122 and outputs decrypted code 112. Decrypted code 112 can be stored back within memory buffer system 122 and then output as decrypted code 124 to further processing circuitry within the processing system integrated circuit 140, for example, through a system interconnect bus 126. The decrypted code 112 can also be provided directly to the system interconnect bus 126 without first being stored within the memory buffer system 122. As described further below, the decryption system 102 includes a decryption engine 104 that decrypts the encrypted code 110 using a secret key 108 and a counter value 106 along with an encryption engine and an XOR logic block. The use of the counter value 106 in addition to the secret key 108 provides for additional security for the encrypted image 134 and associated encrypted code 132 being communicated to the processing system integrated circuit 140. Further, as described herein, encrypted counter values can be generated while the encrypted code 132/110 is being obtained from the external memory 130 and provided to the decryption system 102 so that no additional cycles of latency is introduced into the overall system.

It is noted that the counter-mode decryption engine 104 can be implemented, for example, using an AES encryption engine operated in AES counter mode (e.g., CTR-AES128) to generate encrypted counter values from counter values 106. It is further noted that the secret key 108 can be a 128-bit code, although other key lengths such as key lengths above 128 bits can also be used. It is further noted that the external memory system 130 can be implemented as a Quad-SPI flash memory, and the buffer system 122 can be implemented as one or more Quad-SPI compatible data buffers. Other memory or data storage mediums could also be used.

Figure 2A:
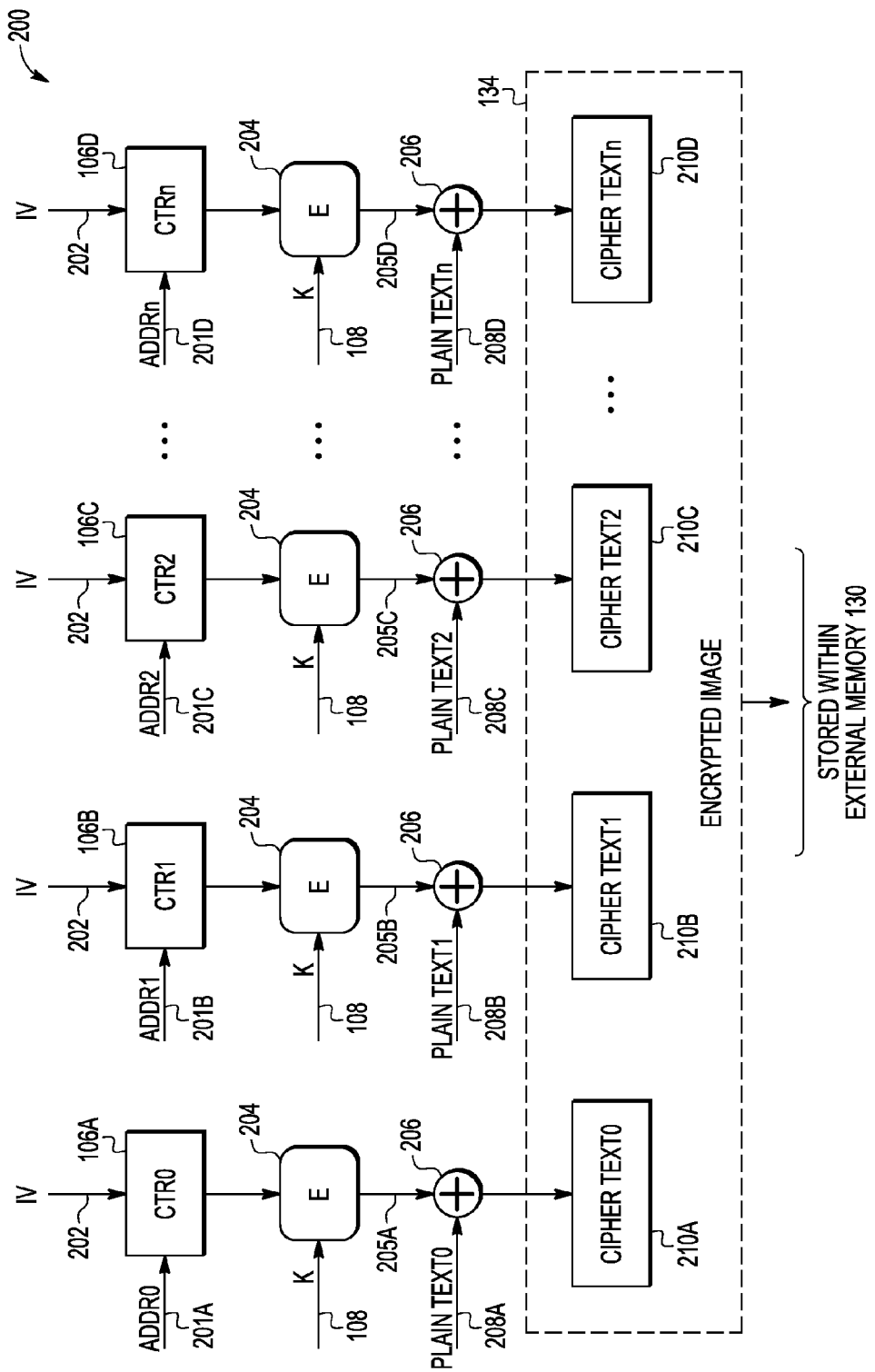
FIG. 2A is a block diagram of an example embodiment for encryption processing of data blocks associated with a software image using a secret key and unique counter values to generate an encrypted software image that is stored within an external memory.

FIG. 2A is a block diagram of an example embodiment 200 for encryption processing of a software image to generate the encrypted image 134 that is stored within the external memory 130. A decrypted or plain text software image is partitioned into N different data blocks, such as 128-bit data blocks, that provide the plain text inputs 208A, 208B, 208C . . . 208D in embodiment 200. The encryption processing uses a secret key (K) 108, counter values (CTR0-n) 106A-D, an encryption (E) engine 204, and XOR logic block 206 to generate encrypted data blocks represented as cipher text 210A, 210B, 210C . . . 210D in embodiment 200. An initialization vector (IV) value 202 is used along with address (ADDR0-n) values 201A, 201B, 201C . . . 201D to generate unique counter values (CTR0-n) 106A, 106B, 106C . . . 106D that are used for each of the N (where N=n+1) encryption operations. An XOR logic operation is then applied to the resulting encrypted counter values 205A, 205B, 205C . . . 205D and the plain text inputs 208A, 208B, 208C . . . 208D in order to generate encrypted data blocks represented by cipher text 210A, 210B, 210C . . . 210D. The resulting encrypted software image 134 is a combination of the cipher text 210A, 210B, 210C . . . 210D data blocks, and the encrypted software image 134 is output by the N different encryption operations depicted for embodiment 200.

In particular, for a first encryption operation, the encryption engine 204 uses the secret key 108 to encrypt a first counter value (CTR0) 106A that is based upon a first address value (ADDR0) 201A and the initialization vector value (IV) 202, and the resulting encrypted counter value 205A is provided to XOR logic block 206 along with a first data block (PLAIN TEXT0) 208A to generate a first encrypted data block (CIPHER TEXT0) 210A. For a second encryption operation, the encryption engine 204 uses the secret key 108 to encrypt a second counter value (CTR1) 106B that is based upon a second address value (ADDR1) 201B and the initialization vector value (IV) 202, and the resulting encrypted counter value 205B is provided to XOR logic block 206 along with a second data block (PLAIN TEXT1) 208B to generate a second encrypted data block (CIPHER TEXT1) 210B. For a third encryption operation, the encryption engine 204 uses the secret key 108 to encrypt a third counter value (CTR2) 106C that is based upon a third address value (ADDR2) 201C and the initialization vector value (IV) 202, and the resulting encrypted counter value 205C is provided to XOR logic block 206 along with a third data block (PLAIN TEXT2) 208C to generate a third encrypted data block (CIPHER TEXT2) 210C. Encryption operations continue with respect to additional data blocks until an Nth data block is reached. For the Nth encryption operation, the encryption engine 204 uses the secret key 108 to encrypt an Nth counter value (CTRn) 106D that is based upon an Nth address value (ADDRn) 201D and the initialization vector value (IV) 202, and the resulting encrypted counter value 205D is provided to XOR logic block 206 along with an Nth data block (PLAIN TEXTn) 208D to generate a Nth encrypted data block (CIPHER TEXTn) 210D. The N encrypted data blocks (CIPHER TEXT0-n) 210A-D are combined to form the encrypted image 134 that is stored within the external memory 130.

It is noted that XOR logic block 206 provides a modulo-2 addition function that operates such that if two input bits have the same logic level (e.g., 00 or 11), a logic "0" is output, and if two input bits have different logic levels (e.g., 01 or 10), a logic "1" is output. Further, the initialization value (IV) 202 can be implemented using an 8-byte or 64-bit random value. The address (ADDR0-n) values 201A-D can be implemented using 32-bit system byte addresses for the software image. The data blocks, secret keys, and encryption operations can use 128-bit bit lengths and operations, and the counter values (CTR0-n) can also be 128-bit values. In one example implementation, each of the counter values (CTR0–n) 106A-D can be formed as follows: (1) the most significant 64 bits include the initialization vector value (IV) 202, (2) the next 32 bits include an XOR of the upper 32 bits of the initialization vector value (IV) 202 with the lower 32 bits of the initialization vector value (IV) 202, and (3) the least significant 32 bits include the 32-bit system byte address provided by address (ADDR0–n) values 201A-D. Other techniques could also be used to form the counter values (CTR0–n). It is also noted that a start address (SRT) and end address (END) for the address (ADDR0–n) values 201A-D, the secret key (K) 108, and the counter initialization value (IV) 202 can be stored in a separate secured data block, such as an encrypted key blob, that is also stored in external memory 130 and communicated to the processing system integrated circuit 140 for decryption and use within the processing system integrated circuit 140. Additional and/or different techniques could also be used to provide these data values to the processing system integrated circuit 140. It is also noted that a blob (Binary Large OBject) is a collection of binary data stored as a single entity in a data storage system, and a key blob includes one or more keys that are used to encrypt other information such as software images. As described below, the key blobs are themselves encrypted using separate key encryption keys, and they are then stored as encrypted key blobs in external memory 130.

Figure 2B:
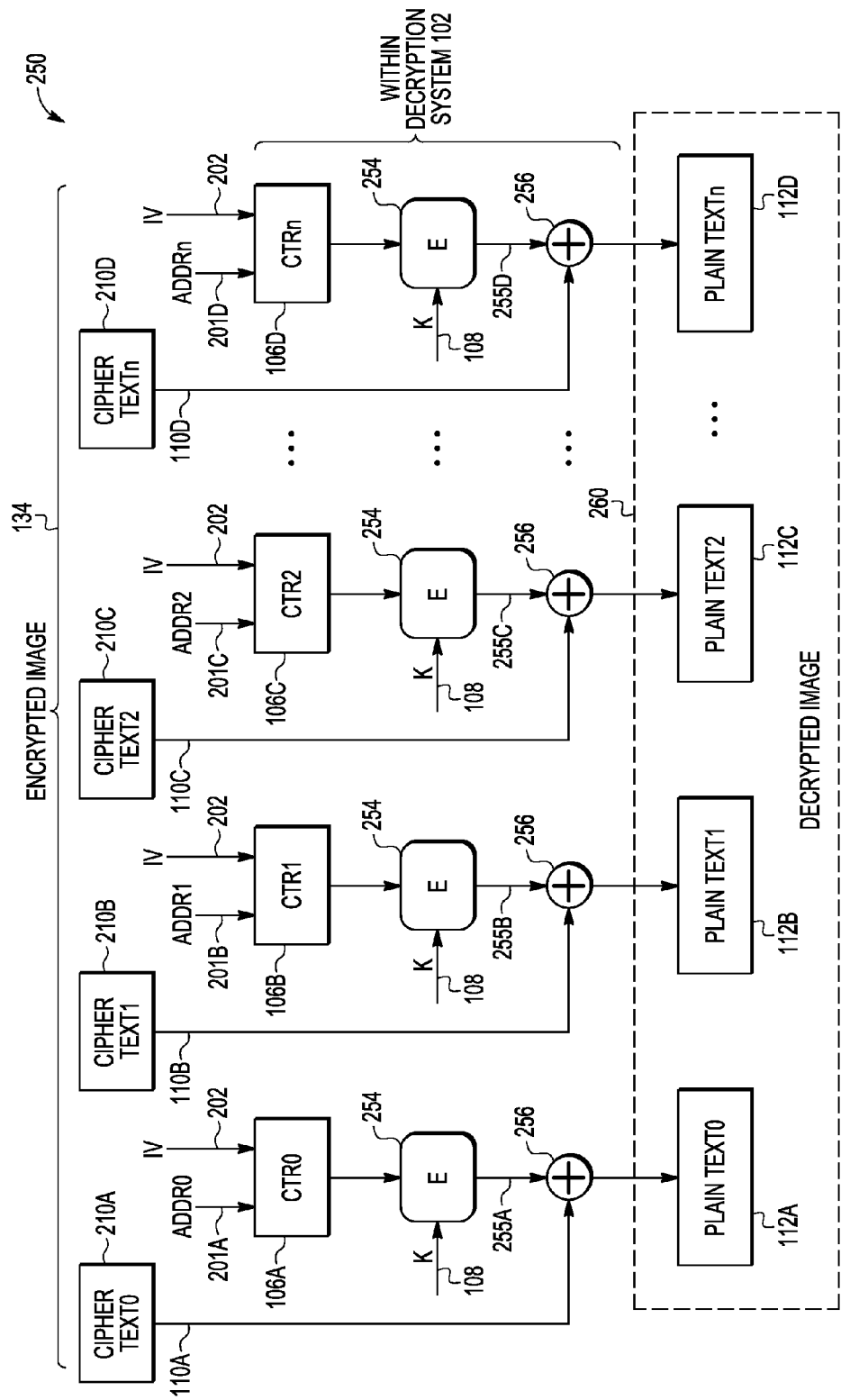
FIG. 2B is a block diagram of an example embodiment for decryption processing of encrypted data blocks associated with an encrypted software image using a secret key and unique counter values to generate a decrypted software image.

FIG. 2B is a block diagram of an example embodiment 250 for the decryption processing by the decryption system 102 to decrypt encrypted code associated with the encrypted software image 134 and to generate a decrypted code associated with a decrypted software image 260. The decryption processing by the decryption system 102 in effect reverses the encryption used to generate the encrypted software image 134. The N different encrypted data blocks for the encrypted software image 134 are provided as cipher text inputs 110A, 110B, 110C . . . 110D in embodiment 250. The decryption processing uses a secret key (K) 108, an encryption (E) engine 254, and an XOR logic block 256 to generate decrypted data blocks represented as plain text 112A, 112B, 112C . . . 112D in embodiment 250. The initialization vector value (IV) 202 and the address (ADDR0–n) values 201A-D are used to generate the different counter values 106A, 106B, 106C . . . 106D, which match the ones used for the encryption processing in FIG. 2A. The encryption engine 254 receives the counter values 106A-D and the secret key 108 and generates encrypted counter values 255A, 255B, 255C . . . 255D. These resulting encrypted counter values 255A-D, which match the encrypted counter values in FIG. 2A, are inputs along with the cipher text inputs 110A, 110B, 110C . . . 110D to the XOR logic block 256. The resulting decrypted data blocks from the XOR logic block 256 are represented by plain text 112A, 112B, 112C . . . 112D, which match the original data blocks represented by plain text 208A-D in FIG. 2A. The resulting decrypted software image 260 is a combination of the plain text data blocks 112A, 112B, 112C . . . 112D.

In particular, for a first decryption operation, the encryption engine 254 uses the secret key 108 to encrypt a first counter value (CTR0) 106A that is based upon the initialization vector (IV) value 202 and a first address (ADDR0) 201A, and the resulting encrypted counter value 255A is provided to XOR logic block 256 along with a first encrypted data block (CIPHER TEXT0) 110A to generate a first decrypted data block (PLAIN TEXT0) 112A. For a second decryption operation, the encryption engine 254 uses the same secret key 108 to encrypt a second counter value (CTR1) 106B that is based upon the initialization vector (IV) value 202 and a second address (ADDR1) 201B, and the resulting encrypted counter value 255B is provided to XOR logic block 256 along with a second encrypted data block (CIPHER TEXT1) 110B to generate a second decrypted data block (PLAIN TEXT1) 112B. For a third decryption operation, the encryption engine 254 uses the same secret key 108 to encrypt a third counter value (CTR2) 106C that is based upon the initialization vector (IV) value 202 and a third address (ADDR2) 201C, and the resulting encrypted counter value 255C is provided to XOR logic block 206 along with a third encrypted data block (CIPHER TEXT2) 202C to generate a third decrypted data block (PLAIN TEXT2) 112C. Decryption operations continue with respect to additional data blocks until an Nth data block is reached. For the Nth decryption operation (again where N=n+1), the encryption engine 254 uses the same secret key 108 to encrypt an Nth counter value (CTRn) 106D that is based upon the initialization vector (IV) value 202 and an Nth address (ADDRn) 201D, and the resulting encrypted counter value 255D is provided to XOR logic block 256 along with an Nth encrypted data block (CIPHER TEXTn) 202D to generate an Nth decrypted data block (PLAIN TEXTn) 112D. The N decrypted data blocks (PLAIN TEXT0–n) 112A-D are combined to form the decrypted software image 260.

It is again noted that XOR logic block 256 provides a modulo-2 addition function that operates such that if two input bits have the same logic level (e.g., 00 or 11), a logic "0" is output, and if two input bits have different logic levels (e.g., 01 or 10), a logic "1" is output. As above, the data blocks, secret keys, and encryption operations can use 128-bit bit lengths and operations, and the counter values (CTR0–n) can also be 128-bit values. In one example implementation, each of the counter values (CTR0–n) 106A-D can be implemented as 128-bit values that are formed as follows: (1) the most significant 64 bits include the initialization vector value (IV) 202, (2) the next 32 bits include an XOR of the upper 32 bits of the initialization vector value (IV) 202 with the lower 32 bits of the initialization vector value (IV) 202, and (3) the least significant 32 bits include the 32-bit system byte address provided by address (ADDR0–n) values 201A-D. As further indicated above, a start address (SRT) and end address (END) for the address (ADDR0–n) values 201A-D, the secret key (K) 108, and the counter initialization value (IV) 202 can be stored in a separate secured data block, such as an encrypted key blob, that is also stored in external memory 130 and communicated to the processing system integrated circuit 140 for decryption and use within the processing system integrated circuit 140. Additional and/or different techniques could also be used to provide these data values to the processing system integrated circuit 140.

As described above, the counter values 106A-D that are used to generate the encrypted counter values 255A-D include addresses (ADDR0–n) 201A-D associated with the encrypted software image 134 stored in external memory 130. Assuming that the N data blocks are 128 bits (e.g., 16 bytes with 8 bits per byte). These addresses (ADDR0–n) 201A-D can be generated, for example, as 32-bit 0-modulo-16 byte system addresses. Other techniques could also be used to generate the address values as well.

One significant advantage provided by the disclosed embodiments is that the encrypted counter values 255A-D can be generated at least in part while the encrypted code 132 is being obtained from the external memory 130 and before these encrypted counter values 255A-D are needed to be used within the decryption system 102. Thus, because the encrypted counter values 255A-D are not dependent on the data or cipher text within the encrypted image 134, the encrypted counter values 255A-D can be pre-generated in response to a system bus access request such that the decryption system 102 only needs to perform the exclusive-OR (XOR) logic operation after each of the encrypted data blocks 110A-D has been fetched from the external memory 130. This ability to pre-generate the encrypted counter values 255A-D allows for zero cycles of incremental latency to be added to the system latency thereby improving system performance while still providing significant protection for the encrypted code 132 communicated from the external memory 130 to the processing system integrated circuit 140.

Figure 3:
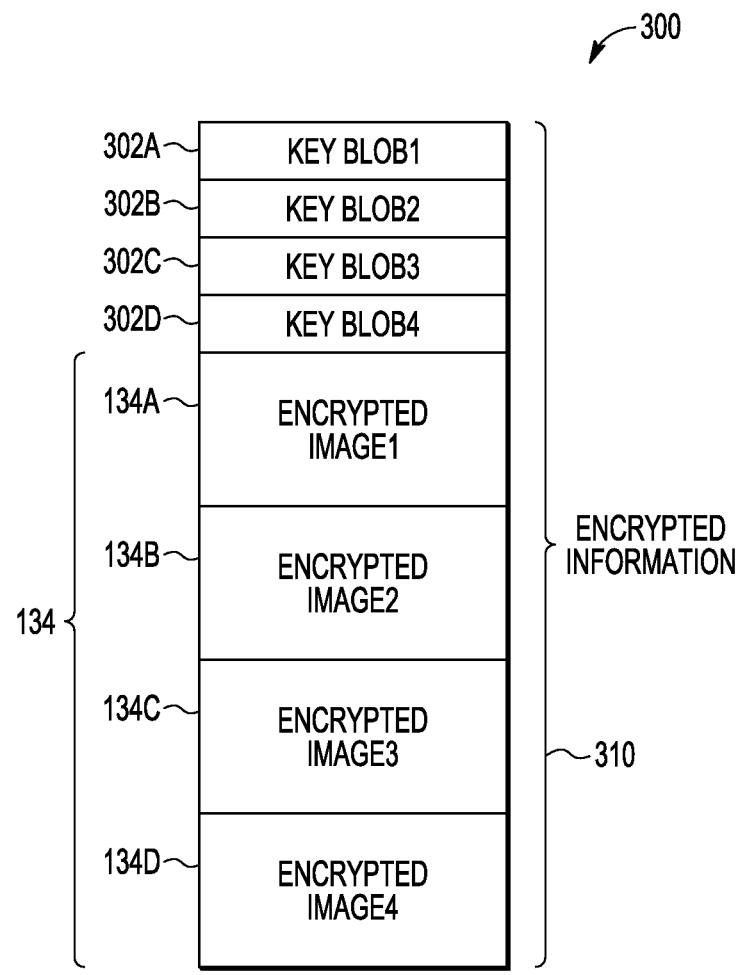
FIG. 3 is a diagram of an example embodiment for encrypted information that can be stored in an external memory and that includes one or more encrypted software images and associated key blobs (Binary Large OBjects).

FIG. 3 is a diagram of an example embodiment 300 for encrypted information 310 that can be stored within the external memory 130 that includes one or more encrypted software images 134A-D. For the example embodiment 300, four encrypted software images 134A, 134B, 134C, and 134D are stored as part of the encrypted information 310. In addition, four encrypted key blobs 302A, 302B, 302C, and 302D are also stored as part of the encrypted information 310, and each one of the encrypted key blobs 302A-D is associated with one of the encrypted images 134A-D. The encrypted software images 134A-D can be generated as described above with respect to FIG. 2A. The encrypted key blobs 302A-D can be encrypted using an encryption algorithm, such as an AES wrap algorithm based upon the AES Key Wrap/Unwrap Algorithm standard as set forth by the Internet Engineering Task Force (IETF) in the RFC 3394 standard. The encrypted key blobs can also be received by the processing system integrated circuit 140 and can be decrypted, for example, using an AES unwrap algorithm based upon the AES Key Wrap/Unwrap Algorithm standard as set forth by the Internet Engineering Task Force (IETF) in the RFC 3394 standard. As described above, the encrypted key blobs 302A-D can be used to communicate the secret key 108, the initialization vector (IV) value 202, start/end addresses for the software images, and/or other desired information to the processing system integrated circuit 140. It is again noted that the encrypted information 310 stored within the external memory 130 can be accessed by the memory controller 120 using one or more memory addresses and/or using other desired techniques.

Figure 4:
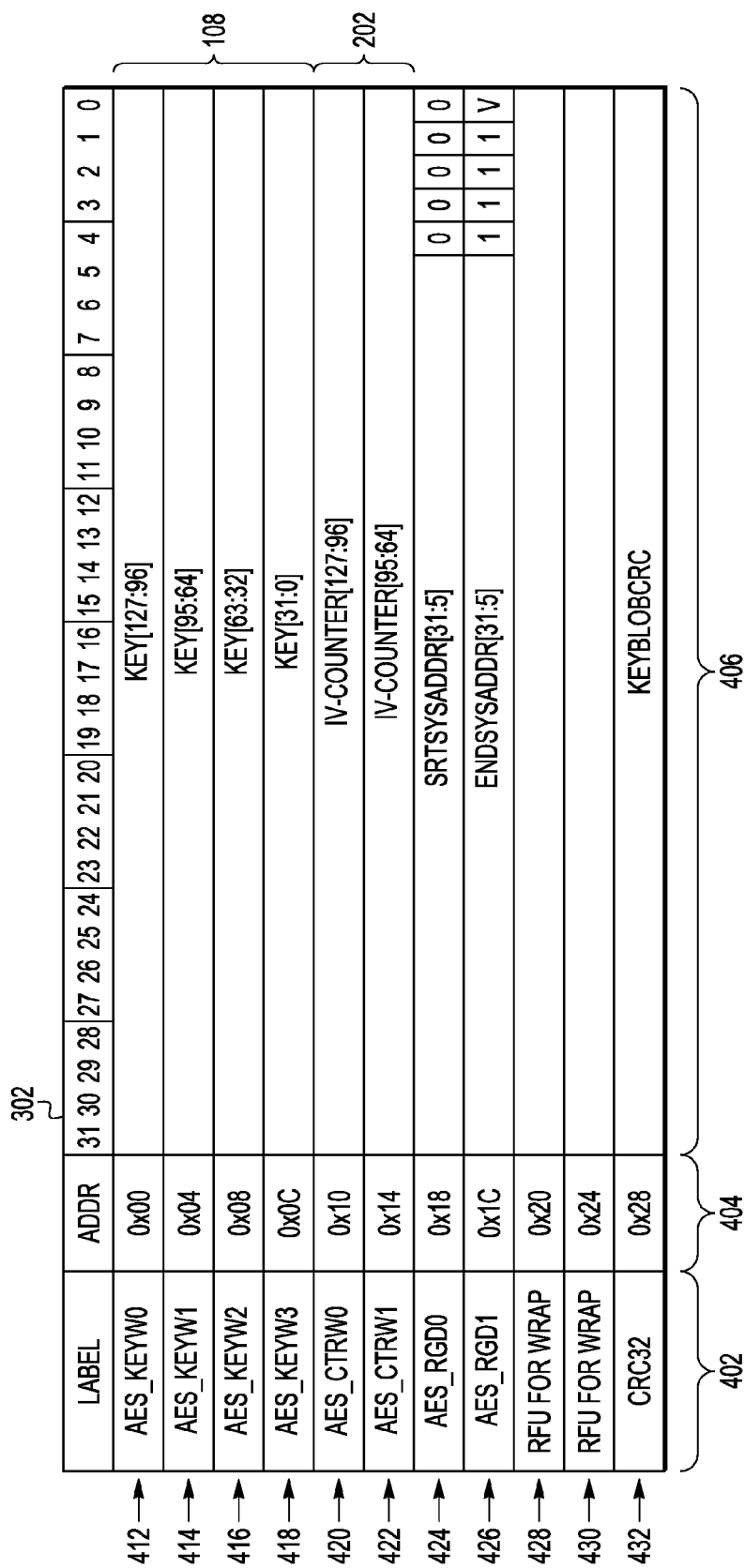
FIG. 4 is a diagram of an example embodiment for contents of a key blob including a secret key, an initialization vector value for generation of unique counter values, and start/end addresses for an encrypted software image associated with the key blob.

FIG. 4 is a diagram of an example embodiment for contents of a key blob 302. Column 402 represents a label for the contents of the various rows within the key blob 302; column 404 represents the address offset in hexadecimal for the start of each of the rows within the key blob 302; and column 406 represents the contents for each row of the key blob 302. For the example embodiment depicted, each row is configured as 32 bits of data from bit 31 (most significant) to bit 31 (least significant), and a 128-bit key is being used for encryption of a software image associated with the key blob 302. Looking to the particular rows within the example key blob 302, the first four rows are used to store the secret key 108, such as a 128-bit AES key; the following two rows are used to store the initialization vector (IV) value 202 for the counter value generation; and the following two rows are used to store the start (SRT) and end (END) system addresses associated with the encrypted software image 134 that is stored within the external memory 130. It is further noted that additional and/or different information can also be stored within the key blob 302.

In particular, row 412 (AES_KeyW0) is used to store bits 96-127 of the AES key (Key[127:96]); row 414 (AES_KeyW1) is used to store bits 64-95 of the AES key (Key[95:64]); row 416 (AES_KeyW2) is used to store bits 32-63 of the AES key (Key[63:32]); and row 418 (AES_KeyW3) is used to store bits 0-31 of the AES key (Key[31:0]). Row 420 (AES_CtrW0) is used to store bits 96-127 of the IV value 202 (IV-Counter [127:96]), and row 422 (AES_CrtW1) is used to store bits 64-95 of the IV value 202 (IV-Counter [95:64]). Row 424 (AES_RGD0) is used to store the start address (SrtSysAddr[31:5]) for the encrypted software image, and row 426 (AES_RGD1) is used to store the end address (EndSysAddr[31:5]) for the encrypted software image. It is further noted that the least significant 5 bits (4:0) for each of row 424 and 426 can include fixed values. For example, bits 0 to 4 of row 424 can be set to "0;" bits 1 to 4 for row 426 can be set to "1," and bit 0 of row 426 can hold a valid (V) bit. Row 432 (CRC32) is used to store an error check value for the data within the key blob 302, such as a 32-bit CRC (cyclic redundancy check) value stored as bits 0-31 (KeyBlobCRC) within row 432. Further, additional rows, such as rows 428 and 430, can be reserved for future use (RFU). Other variations could also be implemented.

Figure 5:
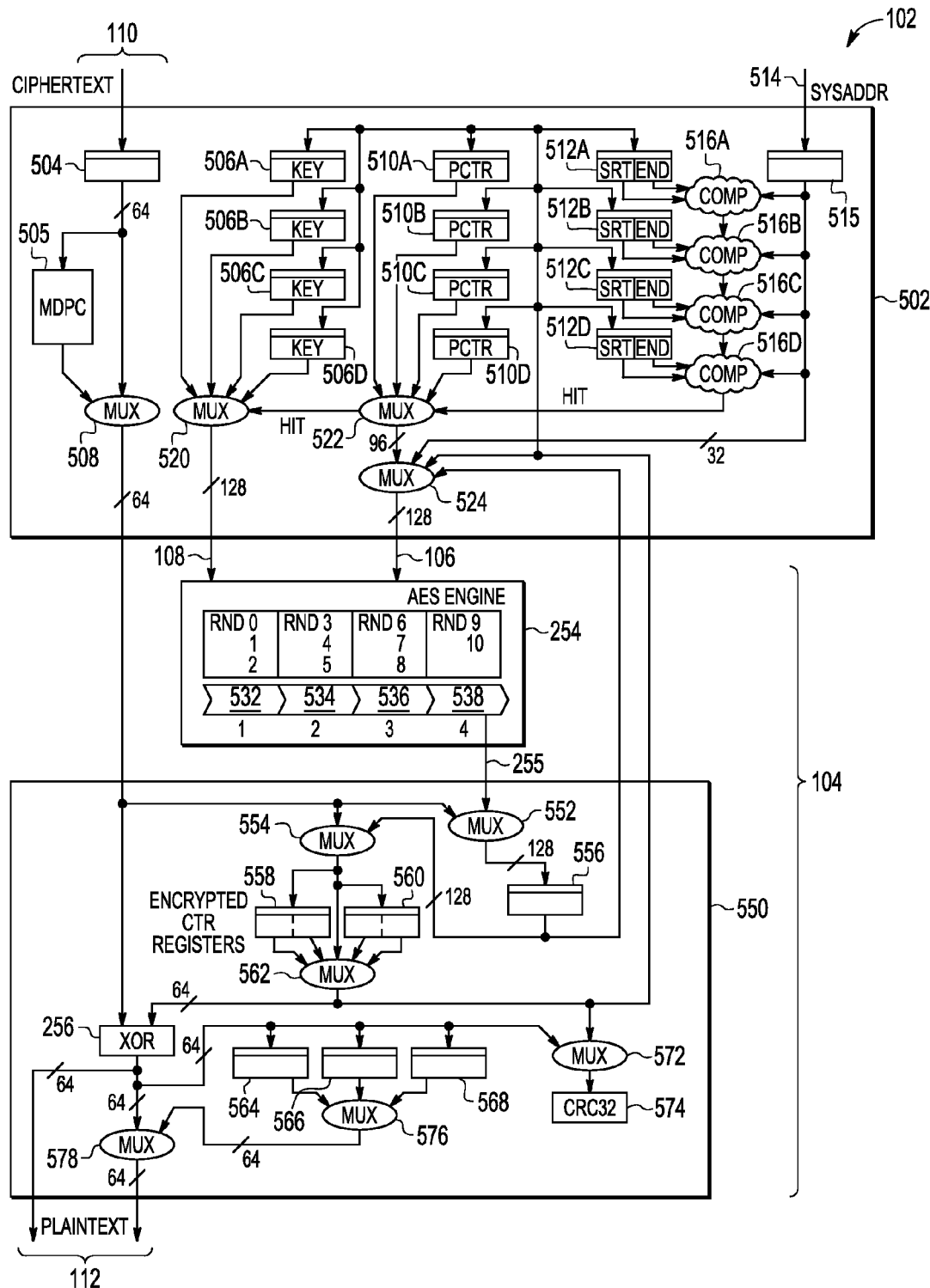
FIG. 5 is a block diagram of an example embodiment for a counter-mode decryption system that pre-generates encrypted counter values to provide zero additional cycles of system latency.

FIG. 5 is a block diagram of an example embodiment for counter-mode decryption system 102 that includes a decryption engine 104. As indicated above, the decryption engine 104 receives a secret key 108, a counter value 106, and encrypted code 110 and operates to generate decrypted code 112. The decryption engine 104 includes an encryption engine 254, such as a 128-bit AES encryption system, and XOR logic block 256 that performs an XOR logic operation on the encrypted counter value 255 and the encrypted code 110. It is noted that the example embodiment of FIG. 5 provides registers 506A-D for four different secret keys, registers 510A-D for four different counter value portions, and registers 512A-D for four different start(srt)/end system addresses that can be associated with up to four different software images 134A-D. It is further noted that different numbers of registers can also be provided, if desired.

Looking in more detail to the upper portion 502 of the example embodiment for decryption system 102, the encrypted code (CIPHER TEXT) 110 is received and stored in register 504 in 64-bit blocks of data. A multi-dimensional parity checker (MDPC) block 505 can be used, if desired, to process, check, and possibly correct the incoming encrypted code 110. A multiplexer (MUX) 508 chooses between the output of the MDPC block 505 and the output of register 504. The output of MUX 508 is provided to the XOR logic block 256 within the lower portion 550 of the example embodiment for decryption system 102. Four registers 506A, 506B, 506C, and 506D are used to store up to four secret keys relating to up to four different encrypted software images. Four registers 510A, 510B, 510C, and 510D are used to store the first 96-bit portion (PCTR) of the counter values related to these encrypted software images. Four registers 512A, 512B, 512C and 512D are used to store start and end addresses for these encrypted software images. The MUX 520 is used to select between the outputs of the registers 506A-D to provide the secret key 108 to the encryption engine 254. The MUX 522 is used to choose between the outputs of the registers 510A-D to provide the first 96-bit portion (PCTR) of the counter value to MUX 524. The last 32 bits of the 128-bit counter value (CTR) 106 that is output to the encryption engine 254 are provided from the system address (SYSADDR) 514 that is stored in register 515. This stored system address from register 515 is also compared to the start/end (SRT/END) addresses within registers 512A-D using address comparators 516A, 516B, 516C, and 516D to determine if an address hit (HIT) has occurred. The resulting address HIT control signal is then used to control the output selection provided by MUX 520 and MUX 522.

The encryption engine 254 receives the counter value (CTR) 106 and the secret key 108. The encryption engine 254 then uses the secret key 108 to encrypt the counter value (CTR) 106 and outputs the encrypted counter value 255. For the example embodiment depicted, AES encryption is provided using an initialization round (RND0) followed by ten additional processing rounds (RND1-10) conducted in four different processing clock cycles 532, 534, 536, and 538. The resulting encrypted counter value 255 is then output to the lower portion 550 of the example embodiment for the decryption system 102. It is noted that each AES round can include one or more of four different transformations including: byte substitution, state array row shift, state array column mix, and round key addition. Different and/or additional processing could also be provided, and variations could be implemented, as desired.

Looking in more detail to the lower portion 550 of the example embodiment for decryption system 102, the encrypted counter value 255 is received by MUX 552 and then stored in register 556. An additional MUX 554 then receives the stored encrypted counter value from register 556 and stores it within one of the encrypted counter (CTR) registers 558 and 560. For the example embodiment depicted, it is assumed that four (4) 64-bit data blocks are being accessed at a time from the external memory 130. As such, two 128-bit encrypted counter values are being generated and stored at any given time within the two encrypted counter (CTR) registers 558 and 560. MUX 562 is used to select one of the four 64-bit data values stored in registers 558/560 to output to XOR logic block 256. The XOR logic block 256 performs an XOR logic operation using as inputs one of the 64-bits associated with the encrypted counter 255 and the 64-bits associated with the encrypted code 110 from register 504. The resulting 64-bit decrypted output is used to provide the decrypted code 112 output by the decryption system 102. As such, for each 4x64 bit access from the external memory 130, two 128-bit decrypted plain text values (PLAINTEXT) are output as the decrypted code 112 by the decryption system 102.

It is noted that a direct output path is provided from XOR logic block 256 that can be connected, for example, to the memory buffer system 122 in FIG. 1, and an additional path through MUX 578 is also provided that can be connected, for example, to the system interconnect bus 126 in FIG. 1. Further, three 64-bit output values from XOR logic block 256 can be stored in registers 564, 566, and 568. A MUX 576 can then be used to select outputs from these registers 564/566/568 to provide to MUX 578 for output to the system interconnect bus 126. These additional registers 564, 566, and 568 can be used, for example, where internal accesses can wrap around address boundaries. In addition, a MUX 572 and an error correction block (CRC32) 574 can also be provided where error detection, such as 32-bit cyclic redundancy check (CRC) detection, is desired to be performed on the decrypted code values from the XOR logic block 256. Still further, connection paths can be provided from MUX 562 to registers within the upper portion 502 for the decryption system 102 to allow loading of these registers with key, counter, and address values. Paths from register 504 and MUX 508 are also provided to MUX 552 and MUX 554 to facilitate the loading of these values during initialization of the processing system integrated circuit 140.

In operation, the decryption system 102 provides a unique counter value (CTR) 106 for every 128-bit data block as the system address (SYSADDR) 514 is included in the last 32 bits of the counter value (CTR) value 106. These different unique counter values (CTR) 106 are also generated during encryption of the original software image. As such, every 128-bit data block of plain text produces different cipher text outputs, and detectable patterns in the input communications between the external memory 130 and the processing system integrated circuit 140 are avoided, thereby improving code and data security protection. In addition, zero cycles of additional latency are added by the decryption system 102 as the encrypted counter (CTR) values 255 are generated prior to these values being needed by the XOR logic block 256. As such, the incremental delay to perform the decryption within decryption system 102 is limited to the relatively insignificant combinational gate delays associated with a final XOR logic operation within XOR logic block 256, and these gate delays are considerably less than a single machine cycle time.

It is further noted that prior solutions implement counter-mode decryption in solutions that both write data to external memory and read data from external memory. However, when writing more than once to external memory using the same address and the same cryptographic key, the counter-mode decryption cannot be used securely. In contrast, the disclosed embodiments overcome these limitations with prior counter-mode decryption solutions by encrypting a range of addresses with a particular cryptographic key only once and then performing decryption of encrypted code from that encrypted memory address range multiple times. As such, the disclosed embodiments can securely fetch and decrypt encrypted code data blocks from encrypted software image(s) 134 stored in external memory 130.

Figure 6:
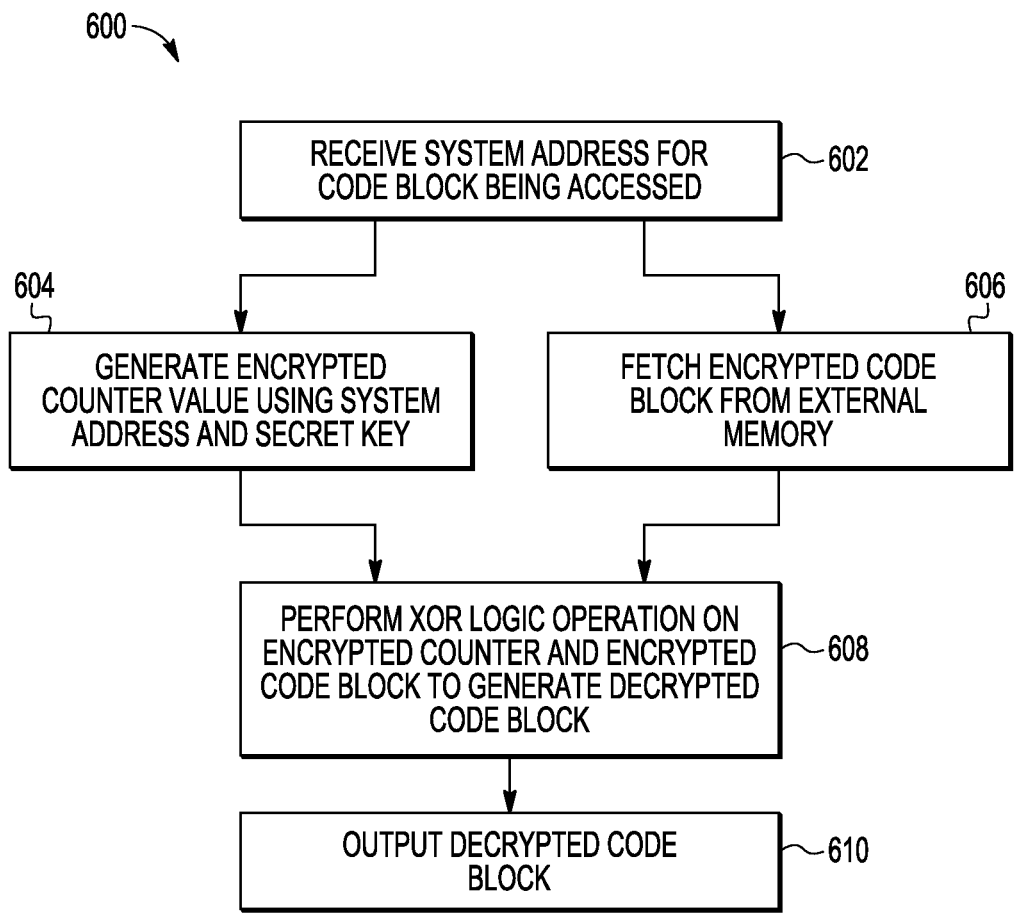
FIG. 6 is a process flow diagram of an example embodiment for counter-mode decryption of an encrypted software image within a processing system integrated circuit.

FIG. 6 is a process flow diagram of an example embodiment 600 for counter-mode decryption of an encrypted software image within a processing system integrated circuit. In block 602, a system address is received for the encrypted code block being accessed. In block 604, an encrypted counter value is generated using the system address and a secret key. In block 606, the encrypted code block is fetched from the external memory. In block 608, an XOR logic function is performed on the encrypted counter value and the encrypted code block to generate a decrypted code block. In block 610, the decrypted code block is output, for example, to a system interconnect bus 126 for further processing within the integrated circuit. As shown in FIG. 6, the encrypted counter value is generated in block 604 while the encrypted code block is being fetched from external memory in block 606 so that no additional cycles of latency is added to the overall system, thereby providing secure code protection while avoiding degradation of system performance.

It is also noted that although the embodiments described herein used counter-mode decryption, other data independent encryption/decryption techniques could also be utilized. The counter-mode encryption/decryption described herein can be considered a block cipher mode of encryption/decryption operation. The use of the unique counter values provides at least two distinct advantages when performing decryption operations versus alternative decryption techniques: (1) the majority of the cryptographic calculations are independent of the input cipher text which is used only in the final XOR function, and (2) random access is supported such that the decryption of any given encrypted code data block is not dependent upon the previous encrypted code data blocks that have been decrypted. If this random access is not important for a given application, then other block cipher modes of operation that rely upon previous decryptions can also be used to provide zero-cycle additional incremental latency performance as described herein. For example, if the encrypted code is accessed sequentially as block1, block2, block(n), then an output feedback (OFB) mode for encryption/decryption can be utilized to provide zero-cycle additional latency.

For this OFB mode of operation, the decryption algorithm is similar to the embodiments described above for the counter (CTR) mode of operation, except that the generation of the input counter values rely upon previous counter values and can be specified as follows:

$CTR0 = E(KEY, IV)$
$CTR1 = E(KEY, CTR0)$
$CTR2 = E(KEY, CTR1) \ldots$
$CTRn = E(KEY, CTRn-1)$ As such, for this generation of counter values, the first counter value (CTR0) is based upon encryption (E) by encryption engine 254 of the key 108 and the initialization vector (IV) 202. The second counter value (CTR1) is based upon encryption (E) by encryption engine 254 of the key 108 and the previous counter value (CTR0). The third counter value (CTR2) is based upon encryption (E) by encryption engine 254 of the key 108 and the previous counter value (CTR1). This continues with the Nth (where N=n+1) counter value (CTRn) being based upon encryption (E) by encryption engine 254 of the key 108 and the previous counter value (CTRn−1). Thus, the OFB mode of encryption/decryption can also be utilized in certain environments, and the encryption/decryption is still data independent except for a final XOR function.

As described herein, a variety of embodiments can be implemented and different features and variations can be implemented, as desired.

For one embodiment, a method is disclosed for decryption within an integrated circuit including obtaining encrypted code associated with an encrypted software image from an external memory that is external to an integrated circuit where the encrypted code being associated with an address, generating an encrypted counter value within the integrated circuit using the address at least in part while the encrypted code is being obtained, and decrypting the encrypted code using the encrypted counter value to generate decrypted code associated with the encrypted software image. In further embodiments, the generating of the encrypted counter value is completed before the obtaining of the encrypted code has completed.

In additional embodiments, the method includes combining an initialization vector value with the address to form a counter value and encrypting the counter value with a secret key to generate the encrypted counter value. In further embodiments, the method also includes receiving the initialization vector value and the secret key from the external memory. In other embodiments, the method also includes receiving a plurality of initialization vector values and a plurality of secret keys for a plurality of encrypted software images stored within the external memory. In still further embodiments, the method includes receiving start and end addresses for the plurality of encrypted software images and using the start and end addresses to select one of the initialization vector values and one of the secret keys for generating the encrypted counter value.

In further embodiments, the decrypting includes performing an exclusive-OR logic operation on the encrypted code and the encrypted counter value. In additional embodiments, the method can include repeating the obtaining, generating, and decrypting for a plurality of addresses for encrypted code within the encrypted software image. In other embodiments, the method includes storing the encrypted code and the decrypted code within a memory buffer system within the integrated circuit. In still further embodiments, the encrypted code and the encrypted counter value can include AES (Advanced Encryption Standard) encryption.

For another embodiment, a system is disclosed for decryption within an integrated circuit including a memory controller and a decryption system within an integrated circuit. The memory controller is configured to use an address to obtain encrypted code from an external memory where the encrypted code is associated with an encrypted software image stored within the external memory. The decryption system is configured to generate an encrypted counter value using the address at least in part while the encrypted code is being obtained, and the decryption system is further configured to decrypt the encrypted code using the encrypted counter value to generate decrypted code associated with the encrypted software image. In further embodiments, the decryption system is configured to complete generation of the encrypted counter value before the memory controller has obtained the encrypted code.

In additional embodiments, the decryption system is further configured to encrypt a counter value with a secret key to generate the encrypted counter value where the counter value includes an initialization vector value combined with the address. In further embodiments, the memory controller is further configured to obtain the initialization vector value and the secret key from the external memory. In other embodiments, the decryption system is configured to obtain a plurality of initialization vector values and a plurality of secret keys for a plurality of encrypted software images from the external memory. In still further embodiments, the decryption system is further configured to store start and end addresses for the plurality of encrypted software images and to use the start and end addresses to select one of the initialization vector values and one of the secret keys for the encrypted counter value.

In further embodiments, the decryption system also includes an exclusive-OR logic block having the encrypted code and the encrypted counter value as inputs and having decrypted code as an output. In additional embodiments, the decryption system is configured to generate a plurality of additional encrypted counter values where each additional encrypted counter value is dependent upon a previous encrypted counter value. In other embodiments, the system includes a memory buffer system, and the encrypted code and the decrypted code are stored within the memory buffer system. In still further embodiments, the encrypted code and the encrypted counter value can include AES (Advanced Encryption Standard) encryption.

It is noted that the functional blocks, devices, and/or circuitry described herein can be implemented using hardware, software, or a combination of hardware and software. In addition, one or more processing devices executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer readable mediums (e.g., data storage devices, flash memory, random access memory, read only memory, programmable memory devices, reprogrammable storage devices, hard drives, floppy disks, DVDs, CD-ROMs, and/or any other tangible storage medium) and that are executed by one or more central processing units (CPUs), controllers, microcontrollers, microprocessors, hardware accelerators, processors, and/or other processing devices to perform the operations and functions described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for an integrated circuit, comprising:
communicating between the integrated circuit and an external memory to obtain encrypted code associated with an encrypted software image stored in the external memory, the encrypted code being associated with an address;
generating an encrypted counter value within the integrated circuit by encrypting a counter value at least in part while the encrypted code is being obtained, the counter value being based upon the address;
after the encrypted code is obtained and after the encrypted counter value is generated, decrypting the encrypted code within the integrated circuit using the encrypted counter value to generate decrypted code associated with the encrypted software image; and
communicating the decrypted code through a system bus interconnect for execution within the integrated circuit.

2. The method of claim 1, wherein the generating of the encrypted counter value is completed before the obtaining of the encrypted code has completed.

3. The method of claim 1, wherein the generating comprises combining an initialization vector value with the address to form the counter value and encrypting the counter value with a secret key to generate the encrypted counter value.

4. The method of claim 3, further comprising receiving the initialization vector value and the secret key from the external memory.

5. The method of claim 3, further comprising receiving a plurality of initialization vector values and a plurality of secret keys for a plurality of encrypted software images stored within the external memory.

6. The method of claim 5, further comprising receiving start and end addresses for the plurality of encrypted software images, and using the start and end addresses to select one of the initialization vector values and one of the secret keys for generating the encrypted counter value.

7. The method of claim 1, wherein the decrypting comprises performing an exclusive-OR logic operation on the encrypted code and the encrypted counter value.

8. The method of claim 1, further comprising repeating the communicating, generating, decrypting, and communicating for a plurality of addresses for encrypted code within the encrypted software image.

9. The method of claim 1, further comprising storing the encrypted code and the decrypted code within a memory buffer system within the integrated circuit.

10. The method of claim 1, wherein the encrypted code and the encrypted counter value comprise AES (Advanced Encryption Standard) encryption.

11. A system within an integrated circuit, comprising:
a memory controller within the integrated circuit coupled to a system bus interconnect and configured to use an address to obtain encrypted code from an external memory, the encrypted code being associated with an encrypted software image stored within the external memory; and
a decryption system within the integrated circuit coupled to the system bus interconnect and configured to encrypt the counter value to generate an encrypted counter value at least in part while the encrypted code is being obtained, the counter value being based upon the address, and the decryption system being further configured, after the encrypted code is obtained and after the encrypted counter value is generated, to decrypt the encrypted code using the encrypted counter value to generate decrypted code associated with the encrypted software image;
wherein the decryption system is further configured to output the decrypted code for communication through the system bus interconnect for execution within the integrated circuit.

12. The system of claim 11, wherein the decryption system is configured to complete generation of the encrypted counter value before the memory controller has obtained the encrypted code.

13. The system of claim 11, wherein the decryption system is further configured to encrypt the counter value with a secret key to generate the encrypted counter value, the counter value comprising an initialization vector value combined with the address.

14. The system of claim 13, wherein the memory controller is further configured to obtain the initialization vector value and the secret key from the external memory.

15. The system of claim 13, wherein the decryption system is configured to obtain a plurality of initialization vector values and a plurality of secret keys for a plurality of encrypted software images from the external memory.

16. The system of claim 15, wherein the decryption system is further configured to store start and end addresses for the plurality of encrypted software images and to use the start and end addresses to select one of the initialization vector values and one of the secret keys for the encrypted counter value.

17. The system of claim 11, wherein the decryption system further comprises an exclusive-OR logic block having the encrypted code and the encrypted counter value as inputs and having decrypted code as an output.

18. The system of claim 11, wherein the decryption system is configured to generate a plurality of additional encrypted counter values, each additional encrypted counter value being dependent upon a previous encrypted counter value.

19. The system of claim 11, further comprising a memory buffer system, and wherein the encrypted code and the decrypted code are stored within the memory buffer system.

20. The system of claim 11, wherein the encrypted code and the encrypted counter value comprise AES (Advanced Encryption Standard) encryption.

* * * * *